Patented Feb. 20, 1923.

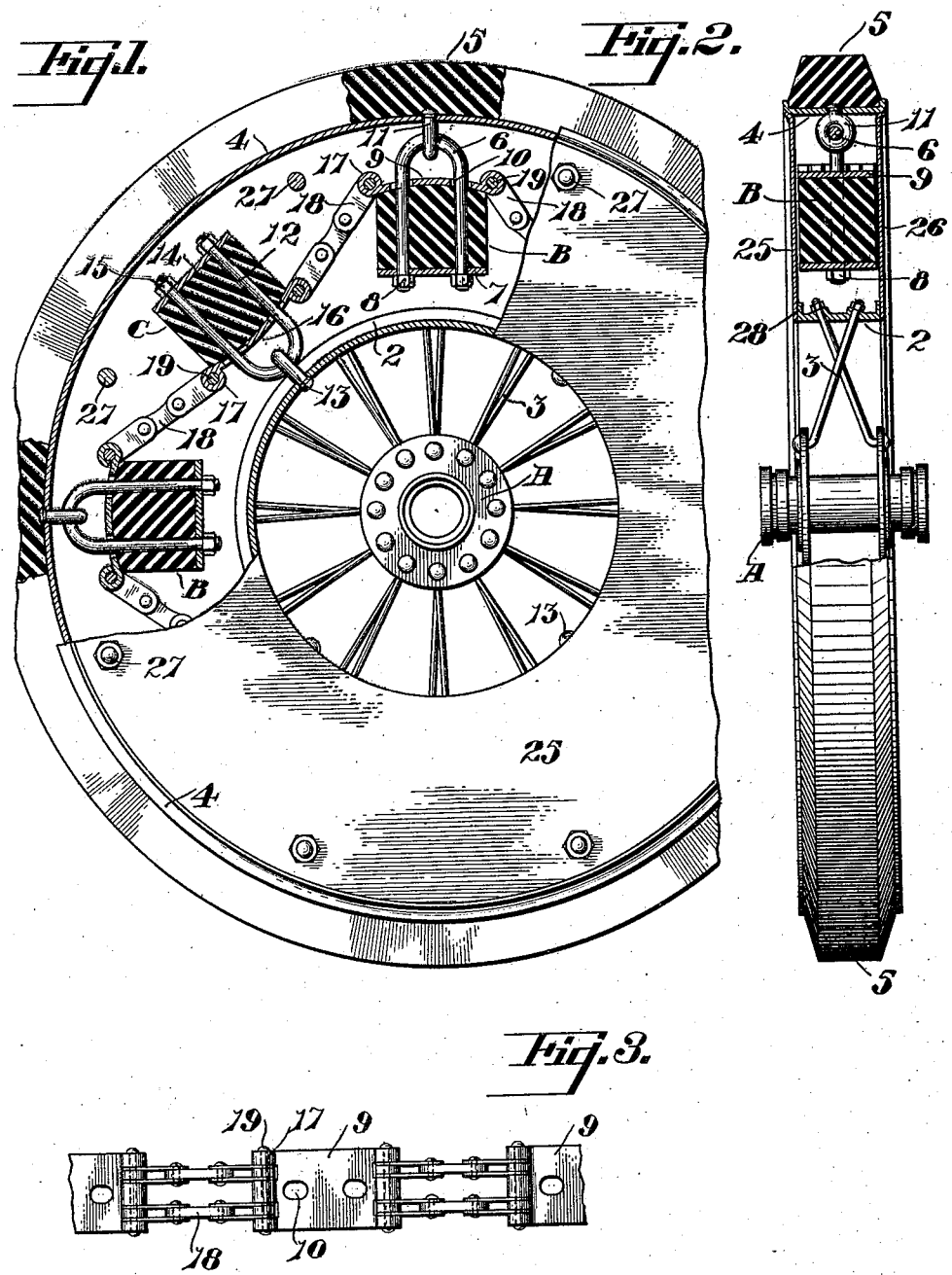

1,446,053

UNITED STATES PATENT OFFICE.

NIKOLAY MALMAN, OF SAN FRANCISCO, CALIFORNIA.

RESILIENT WHEEL.

Application filed June 14, 1922. Serial No. 568,277.

*To all whom it may concern:*

Be it known that I, NIKOLAY MALMAN, a citizen of the United States, residing at the city and county of San Francisco, and State of California, have invented new and useful Improvements in Resilient Wheels, of which the following is a specification.

This invention relates to resilient wheels and especially to that type in which a resilient structure is interposed between the felloe and the wheel hub.

The object of the present invention is to generally improve and simplify wheels of the character described; to provide a resilient structure adapted to be interposed between the felloe and the hub of a wheel whereby a limited radial and circumferential movement of the felloe with relation to the hub will be permitted; to provide a structure of this character which is substantially dust and water-proof, and which secures the felloe against lateral movement with relation to the hub, and further to provide means whereby the resiliency of the interposed structure may be readily adjusted to varying loads. Other objects will hereinafter appear.

One form which my invention may assume is exemplified in the following description and illustrated in the accompanying drawings, in which—

Fig. 1 is a side elevation of the wheel partially in section and partially broken away.

Fig. 2 is an end view of the wheel partially in section and partially in elevation.

Fig. 3 is a detail view showing the flexible chain whereby the resilient rubber blocks are held in position and whereby traction is transmitted from the hub to the felloe.

Referring to the drawings in detail, and particularly to Figs. 1 and 2, A indicates a standard form of wheel hub, 2 an inner felloe, 3 spokes connecting the inner felloe and the hub, 4 an exterior felloe and 5 a rubber tire carried thereby. Interposed between the inner felloe and the exterior felloe 4 is a resilient structure through which turning movement is transmitted from the inner felloe to the exterior felloe and whereby a limited circumferential and radial movement of the exterior felloe with relation to the interior felloe and hub is permitted. The resilient structure consists of a series of rubber blocks B and C. These blocks are disposed approximately centrally between the inner and outer felloes and they are circumferentially spaced as shown. The blocks B are secured to the outer felloe, while the blocks C are secured to the inner felloe. They are furthermore pivotally attached to their respective supports and this is accomplished in the following manner:

Passing through the rubber blocks B is a U-bolt 6. Engaging one end of the rubber block is an inner flat plate 7 through which the bolt passes, and securing the bolt are nuts as indicated at 8. Engaging the upper end of the block is a plate or a saddle member 9, this saddle member being perforated as at 10 to permit the U-bolt to pass therethrough. The U-bolt proper is attached to the exterior felloe 4 by means of an eye bolt 11, which is secured to the felloe in any suitable manner. The rubber block is in other words held by the U-bolt 6 and is secured thereon between the plates 7 and the saddle 9. It is otherwise freely hung so that a certain amount of circumferential movement may take place as will hereinafter be described.

The blocks C are all attached to the inner felloe 2 and in fact in a manner identical to that of attaching the blocks B to the exterior felloe, that is a U-bolt 12 is employed, an eye bolt 13, a plate 14, nuts 15 and a saddle member 16, the plates 14 and 7 being identical in construction, the plates or saddles 9 and 16 being also identical in construction, and similarly the U-bolts 6 and 12 and the eye bolts 11 and 13; the only difference being that one set of blocks is attached to the exterior felloe, while the other set is attached to the inner felloe. It may here be stated that they are arranged in staggered formation and that the saddle members 9 and 16 will for this reason assume opposed positions, that is the saddle 9 will engage the outer ends of the resilient rubber blocks B, while the saddle 16 will engage the inner ends of the resilient rubber blocks C.

To permit the transmission of turning movement from the inner felloe to the outer felloe and to limit circumferential movement and radial movement of the outer felloe with relation to the inner felloe, a flexible connection is provided whereby the saddle members 9 and 16 are connected, that is the ends of the saddle members 9 and 16 terminate in hinge lugs 17, and these lugs are provided for the reception of chain links 18, which form a pivotal connection between the respective lugs 17, that is a pin 19 is passed through each set of lugs 17 and links 18 and as such forms a pivotal connection between the saddle members 9 and 16.

When the wheel is assembled and a load applied to the hub member A, it can readily be seen that the rubber blocks B and C will be subjected to compression strains as the hub A will naturally tend to settle in a downward direction towards the outer felloe 4, or in other words move radially with relation to the exterior felloe. Such movement will in this instance be resisted by the blocks B and D as the entire load will be equally divided on the alternate blocks. The degree of resiliency produced depends entirely upon the amount of compression to which the blocks B and C are subjected and this degree of compression may be regulated by tightening up or loosening the ends 8 and 15, and the wheel may for this reason be adjusted to varying loads. If the wheel illustrated happens to be the rear driving wheel, for instance of an automobile, it is obvious that a certain amount of circumferential movement of the exterior felloe with relation to the interior felloe would be desirable as it would tend to relieve the driving mechanism of sudden strains and pulls, such resiliency and movement being obtained in the present instance by the connection formed between the eyes 11 and 13 and the respective U-bolts 6 and 12. Radial movement of the exterior felloe or conversely the hub and inner felloe will also be permitted when the wheel is subjected to road shocks as the blocks C and D will give to a limited degree when subjected to such shocks.

In view of the position of the resilient members B and C and the action obtained through the employment of the same, it is obvious that pneumatic tires may be entirely dispensed with and that any standard form of solid rubber tire may be employed as illustrated; further that this tire may be secured upon an ordinary clincher rim or otherwise secured.

For the purpose of excluding dust and water, and also for the purpose of securing the outer felloe against lateral movement with relation to the hub A and the inner felloe, a pair of exterior side plates 25 and 26 is employed. These plates engage the respective sides of the exterior felloe and are secured thereto by means of transverse bolts 27. These bolts are circumferentially arranged and interspaced as shown and thus rigidly secure the side plates to the exterior felloe. Frictional engagement is maintained between the inner felloe and the side plates and the surface of contact may be increased or decreased as desired by turning up the side flanges of the inner felloe as indicated at 28. A substantially dust and water-proof joint may in this manner be obtained without in any way interfering with the resilient action of the wheel and lateral movement of the exterior felloe with relation to the hub and inner felloe is simultaneously taken care of.

Figs. 1 and 2 illustrate a rather specific form of the present invention, and I therefore wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. A wheel of the character described comprising a hub and a felloe, a plurality of circumferentially interspaced resilient members disposed between the felloe and hub, means securing the resilient members alternately to the felloe and the hub, and separate circumferentially arranged flexible connecting members passing alternately over and under the respective resilient members.

2. A wheel of the character described, comprising a hub and a felloe, a plurality of separate, spaced resilient members interposed between the hub and felloe and pivotal means connecting the outer side of the alternate resilient members with the inner side of the adjacent resilient members.

3. In a wheel of the character described the combination with the inner and outer felloe, of a plurality of resilient members secured to the inner felloe and interspaced with relation to each other, a plurality of resilient members secured to the outer felloe and disposed between the first named resilient members, the said members being spaced from the felloes and a flexible connecting member passing alternately over and under the several resilient members.

4. In a wheel of the character described the combination with the inner and outer felloe, of a plurality of separate, spaced resilient members secured to the inner felloe and interspaced with relation to each other, a plurality of separate, spaced resilient members secured to the outer felloe and disposed between the first named resilient members, and a flexible connecting member passing over the resilient members secured to the outer felloe and under the resilient members secured to the inner felloe.

5. In a wheel of the character described the combination with the inner and the outer felloe, of a plurality of U-bolts pivotally attached to the inner felloe, said U-bolts being radially disposed and interspaced with relation to each other, a plurality of U-bolts pivotally attached to the outer felloe and radially disposed with relation thereto, and disposed between the U-bolts secured to the inner felloe, a rubber block slidably mounted on each set of U-bolts, a plate adjustably secured on the inner end of the U-bolts attached to the outer felloe by which the rubber blocks carried thereby are secured against inward movement towards the inner felloe, plates secured to the outer ends of the U-bolts attached to the inner felloe by which the rubber blocks carried thereby are secured against outward movement with relation to the outer felloe, a saddle member slidably mounted on said U-bolts and engaging the opposite ends of each rubber block, a saddle member slidably mounted on each U-bolt secured to the outer felloe and engaging the outer ends of the rubber blocks carried thereby, and flexible means connecting the respective saddle members.

6. In a wheel of the character described the combination with the inner and the outer felloe, of a plurality of U-bolts pivotally attached to the inner felloe, said U-bolts being radially disposed and interspaced with relation to each other, a plurality of U-bolts pivotally attached to the outer felloe and radially disposed with relation thereto, and disposed between the U-bolts secured to the inner felloe, a rubber block slidably mounted on each set of U-bolts, a plate adjustably secured on the inner end of the U-bolts attached to the outer felloe by which the rubber blocks carried thereby are secured against inward movement towards the inner felloe, plates secured to the outer ends of the U-bolts attached to the inner felloe by which the rubber blocks carried thereby are secured against outward movement with relation to the outer felloe, a saddle member slidably mounted on said U-bolts and engaging the opposite end of each rubber block, a saddle member slidably mounted on each U-bolt secured to the outer felloe and engaging the outer ends of the rubber blocks carried thereby, and links pivotally connecting the respective saddle members.

7. In a wheel of the character described the combination with the inner and the outer felloe, of a plurality of U-bolts pivotally attached to the inner felloe, said U-bolts being radially disposed and interspaced with relation to each other, a plurality of U-bolts pivotally attached to the outer felloe, and radially disposed with relation thereto, and disposed between the U-bolts secured to the inner felloe, a rubber block slidably mounted on each set of U-bolts, a plate adjustably secured on the inner end of the U-bolts, attached to the outer felloe by which the rubber blocks carried thereby are secured against inward movement towards the inner felloe, plates secured to the outer ends of the U-bolts attached to the inner felloe by which the rubber blocks carried thereby are secured against outward movement with relation to the outer felloe, a saddle member slidably mounted on said U-bolts and engaging the opposite end of each rubber block, a saddle member slidably mounted on each U-bolt secured to the outer felloe and engaging the outer ends of the rubber blocks carried thereby, links pivotally connecting the respective saddle members, and a pair of side plates secured to the outer felloe and engaging the inner felloe, said side plates securing the felloes against lateral movement with relation to each other, and also forming a substantially water and dust proof housing for the rubber blocks and the means securing the same to the respective felloes.

8. In a wheel of the character described the combination with the inner and the outer felloe, of a plurality of resilient members pivotally secured to the outer felloe, a plurality of resilient members pivotally attached to the inner felloe, the resilient members attached to the inner felloe being disposed between the resilient members which are attached to the outer felloe, a saddle member engaging the inner end of the resilient members secured to the inner felloe, saddle members engaging the outer ends of the resilient members secured to the outer felloe, and links pivotally connecting the respective saddle members.

9. In a wheel of the character described the combination with the inner and the outer felloe, of a plurality of resilient members pivotally secured to the outer felloe, a plurality of resilient members pivotally attached to the inner felloe, the resilient members attached to the inner felloe being disposed between the resilient members which are attached to the outer felloe, a saddle member engaging the inner end of the resilient members secured to the inner felloe, saddle members engaging the outer ends of the resilient members secured to the outer felloe, flexible means connecting the saddle members, and means for increasing or decreasing the resiliency of the respective resilient members.

NIKOLAY MALMAN.